United States Patent
Niguchi (10) Patent No.: US 7,902,709 B2
(45) Date of Patent: Mar. 8, 2011

(54) BRUSH-LESS MOTOR AND ELECTRIC POWER STEERING DEVICE HAVING BRUSH-LESS MOTOR

(75) Inventor: Noboru Niguchi, Kashihara (JP)

(73) Assignee: JTEKT Corporation, Osaka-shi (JP)

(*) Notice: Subject to any disclaimer, the term of this patent is extended or adjusted under 35 U.S.C. 154(b) by 257 days.

(21) Appl. No.: 12/045,240

(22) Filed: Mar. 10, 2008

(65) Prior Publication Data

US 2008/0224559 A1 Sep. 18, 2008

(30) Foreign Application Priority Data

Mar. 13, 2007 (JP) .................................. 2007-063638

(51) Int. Cl.
*H02K 21/12* (2006.01)
(52) U.S. Cl. .................................................. 310/156.47
(58) Field of Classification Search ............. 310/156.01, 310/156.47, 156.48, 156.62
See application file for complete search history.

(56) References Cited

U.S. PATENT DOCUMENTS

| | | | |
|---|---|---|---|
| 7,034,424 B2* | 4/2006 | Kometani et al. | 310/156.47 |
| 7,541,710 B2* | 6/2009 | Nemoto et al. | 310/156.47 |
| 2002/0047431 A1* | 4/2002 | Fukushima | 310/156.47 |
| 2003/0201137 A1* | 10/2003 | Crapo et al. | 180/444 |
| 2007/0273241 A1 | 11/2007 | Niguchi et al. | |

FOREIGN PATENT DOCUMENTS

| | | |
|---|---|---|
| JP | 2001-314050 | 11/2001 |
| JP | 2005-65455 | 3/2005 |

* cited by examiner

*Primary Examiner* — Nguyen N Hanh
(74) *Attorney, Agent, or Firm* — Oblon, Spivak, McClelland, Maier & Neustadt, L.L.P.

(57) ABSTRACT

A permanent magnet included in a rotor of a brush-less motor is a radial anisotropic magnet in which multi-poles are magnetized in the circumferential direction and is skew magnetized along the axial direction in such a manner that a surface to one end part of an upper side from a central part in the axial direction and a surface to an end part of a lower side from the central part are axially shifted by a predetermined angle in the circumferential direction from each other. In accordance with this skew-magnetization, coggings including irregularly varying components generated in the rotor owing to the three-dimensional shapes of coil ends provided at opposite ends of a tooth 611a for fixing a winding have opposite phases to each other, so that the coggings are cancelled with each other. Accordingly, the coggings can be reduced or cancelled.

4 Claims, 7 Drawing Sheets

BRUSH-LESS MOTOR AND ELECTRIC POWER STEERING DEVICE HAVING BRUSH-LESS MOTOR

This application is based upon and claims the benefit of priority of Japanese Patent Application No. 2007-063638 filed on Mar. 13, 2007, the contents of which are incorporated herein by reference in its entirety.

BACKGROUND OF THE INVENTION

The present invention relates to a brush-less motor having in a rotor one magnet whose multi-poles are magnetized and an electric power steering device for applying a steering assist force to a steering mechanism of a vehicle by the brush-less motor.

An electric power steering device has been hitherto used that an electric motor such as a brush-less motor is driven in accordance with a steering torque applied to a handle (a steering wheel) by a driver.

The brush-less motor ordinarily used in such an electric power steering device is a permanent magnet type electric motor including a stator having a winding (coil) and a rotor provided with a permanent magnet, and most of the brush-less motors are driven by a three-phase electric power. As for the windings of the stator, plural windings are ordinarily provided for each phase and a plurality of poles of the permanent magnet are also ordinarily provided correspondingly thereto. Accordingly, the permanent magnet preferably has a radial anisotropy in which the multiple poles can be easily magnetized.

In fact, since the magnet having the radial anisotropy is hardly inexpensively produced, a magnet having a polar anisotropy that is relatively inexpensive and high in its magnetic flux density may be sometimes used. Since the magnet having the polar anisotropy is magnetized according to a magnetic path given during a molding process, the poles cannot be arranged at arbitrary positions as in the magnet having the radial anisotropy. Accordingly, when what is called a skew is tried to be applied (namely, skew-magnetized) to the magnet having the polar anisotropy to be used as a rotor, it is impossible to arrange the poles obliquely with respect to the axial direction on the surface of one magnet having the polar anisotropy. Thus, in place of such a structure, for instance, there is a structure that two magnets having the polar anisotropy are prepared and these magnets are shifted from each other by an angle of skew on an axis of a cylinder and axially connected (see JP-A-2001-314050). A motor including the rotor composed of the magnet having such a usual structure can reduce or cancel at least a low order cogging.

To sufficiently reduce or cancel the cogging including a high order cogging, the skew is ordinarily applied so that the poles are respectively arranged obliquely with respect to the axial direction on the surface of the magnet as the rotor as described above. The skew is ordinarily obliquely magnetized, as mentioned above, on the above-described magnet having the radial anisotropy.

When even the magnet having the radial anisotropy has a special shape, a structure may be sometimes used that two magnets are shifted from each other around an axis of a cylinder and connected in the axial direction (see JP-A-2005-65455). In this usual structure, the cylindrical magnet having the radial anisotropy has a special shape that a plurality of cut-out parts are provided along the axial direction on a surface thereof. Accordingly, in this usual structure, a magnetization is simply carried out along the axial direction so as to meet the special shape. As long as the magnet does not have such a special shape, to sufficiently reduce or cancel the cogging, a skew is ordinarily applied to the magnet having the radial anisotropy so that the poles are respectively obliquely arranged.

However, the motor having the ordinary and usual magnet having the radial anisotropy in which the skew magnetization is obliquely carried out as described in JP-A-2001-314050 cannot adequately reduce a cogging generated owing to the shape of a stator.

For instance, the stator provided so as to be opposed to the rotor preferably has the same shape in any of sections perpendicular to the axial direction of the rotor correspondingly to the cylindrical shape of the rotor. However, typically, when coil ends for fixing the winding at opposite ends of the stator are provided, parts in the vicinity of the opposite ends of the stator may not possibly have the same sectional shapes along the axial direction due to the three-dimensional shapes of the coil ends. According to such a structure, in parts near the opposite ends of the rotor corresponding to parts near the coil ends, a cogging including irregularly varying components corresponding to the three-dimensional shapes arises.

In a structure with such a shape of the stator in which the skew magnetization in the oblique direction is carried out, since a cogging of an opposite phase to cancel the above-described cogging including the irregularly varying components with each other does not include the irregularly varying components, these cogging does not completely cancel with each other. After all, the cogging cannot be sufficiently reduced.

Namely, in the above-described structure in which the skew magnetization in the oblique direction is carried out, the lowest order cogging generated in a certain position of the rotor has an opposite phase to a phase of a cogging generated at a position spaced by a distance substantially half as long as a length in the axial direction from that position. Accordingly, the cogging whose phase is opposite to the phase of the cogging generated in the parts in the vicinity of the opposite ends of the rotor corresponding to the parts in the vicinity of the coil ends of the stator arises in a part in the vicinity of the center of the rotor. Then, since the cogging arising in the vicinity of the center of the rotor does not include, as a matter of course, the irregularly varying components, the cogging cannot be finally sufficiently reduced. This will be briefly described by referring to FIGS. 5 and 6.

FIG. 5 is an external appearance view simply showing teeth and a magnetized state of the usual permanent magnet. FIG. 6 is a wave form diagram for explaining that the cogging is not reduced or cancelled by the usual structure. Referring to FIG. 6, the cogging generated at a position A and a position D includes the irregularly varying components due to the coil ends having the three-dimensional shapes as shown in FIG. 5. However, since the cogging does not have the opposite phases, they cannot be cancelled with each other. As a result, the cogging is not adequately reduced.

SUMMARY OF THE INVENTION

Thus, it is an object of the present invention to provide a brush-less motor that can reduce or cancel a cogging including irregularly varying components due to the shape of a stator. Further, it is another object of the present invention to provide an electric power steering device including the above-described brush-less motor.

According to a first aspect of the invention, a brush-less motor comprises:

an annular stator; and a rotor disposed inside the stator and supported rotatably relative to the stator and includes a single annular permanent magnet having a plurality of poles in the circumferential direction, wherein the stator includes:

a plurality of same shape teeth parts that are arranged at equal intervals along a circumferential direction and extend toward the rotor, respectively; and an annular yoke part that connects the plurality of teeth parts together, wherein each of the teeth parts includes two parts, the two parts are respectively disposed at positions a substantially equal distance spaced from a central part in an axial direction, and have a sectional shape perpendicular to an axial direction of the rotor within a range opposed to the rotor is different from a sectional shape of the remaining part of the teeth part, and wherein the permanent magnet has the plurality of poles magnetized in such a manner that a surface to one end part from the central part in the axial direction and a surface to the other end part from the central part are axially shifted by a predetermined angle in the circumferential direction from each other.

According to a second aspect of the invention, in the brush-less motor according to the first aspect, the plurality of poles are magnetized along the axial direction.

According to a third aspect of the invention, in the brush-less motor according to the first aspect, the plurality of poles are magnetized so as to be shifted in the circumferential direction by an angle obtained by dividing 180 degrees by a least common multiple of the number of the plurality of poles and the number of the plurality of teeth parts.

According to a fourth aspect of the invention, in the brush-less motor according to the first aspect, the yoke part is made of a laminated steel plate, and the teeth parts respectively have parts in the vicinity of the central part in the axial direction of the rotor that are made of the laminated steel plate and parts in the vicinity of opposite end parts that are made of a soft magnetic powder material.

According to a fifth aspect of the invention, an electric power steering device comprises the brush-less motor according to the first aspect, wherein the brush-less motor is driven in accordance with an operation by an operating unit for steering a vehicle to give a steering assist force to a steering mechanism of the vehicle.

According to the first aspect, the permanent magnet included in the rotor is magnetized in such a manner that the surface to one end part from the central part in the axial direction and the surface to the other end part from the central part are axially shifted by a predetermined angle in the circumferential direction from each other. Thus, a cogging can be reduced or cancelled that includes irregularly varying components generated owing to the parts respectively having the different sectional shape of the teeth parts, for instance, the three-dimensional shapes of coil ends typically provided in the teeth parts.

According to the second aspect, since the poles of the permanent magnet are magnetized along the axial direction, a torque loss can be more suppressed than a case that the poles are obliquely magnetized.

According to the third aspect, since the plurality of poles of the permanent magnet are magnetized so as to be shifted in the circumferential direction by an angle obtained by dividing 180 degrees by the least common multiple of the number of the plurality of poles and the number of the plurality of teeth parts, a cogging torque to be theoretically generated can be sufficiently suppressed by a simply calculated angle of skew.

According to the fourth aspect, since the yoke part and the parts of the teeth parts in the vicinity of the central part are made of the laminated steel plate, an eddy current loss can be decreased. Further, since the parts of the teeth parts in the vicinity of the opposite end parts are made of the soft magnetic powder material, the three-dimensional shapes can be easily formed.

According to the fifth aspect, since the electric power steering device including the brush-less motor that exhibits the same effects as those of the first invention can be provided, a steering feeling can be improved.

DETAILED DESCRIPTION OF PREFERRED EMBODIMENTS

Now, referring to the attached drawings, an embodiment of the present invention will be described below.

<1. Entire Structure>

Figure 1:
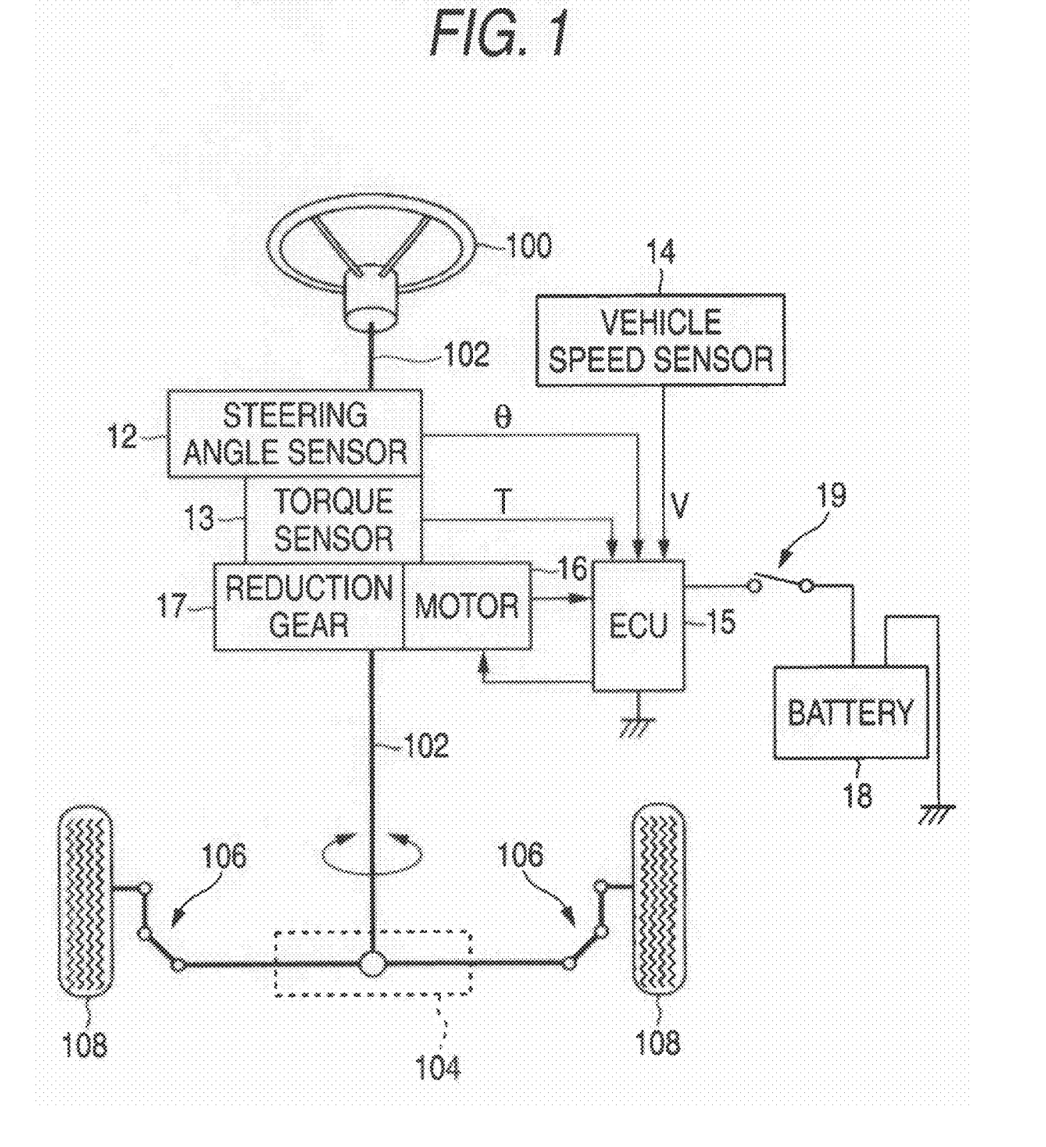
FIG. 1 is a schematic diagram showing both a structure of an electric power steering device according to one embodiment of the present invention and a structure of a vehicle associated therewith.

FIG. 1 is a schematic diagram showing both a structure of an electric power steering device according to one embodiment of the present invention and a structure of a vehicle associated therewith. The electric power steering device includes a steering shaft 102 having one end attached to a handle (a steering wheel) 100 as an operating unit for steering, a rack pinion mechanism 104 connected to the other end of the steering shaft 102, a steering angle sensor 12 for detecting a steering angle showing the rotating position of the handle 100, a torque sensor 13 for detecting a steering torque applied to the steering shaft 102 by the operation of the handle 100, a brush-less motor 16 for generating a steering assist force for reducing a load of a driver in operating the handle (a steering operation), a reduction gear 17 for transmitting the steering assist force to the steering shaft 102 and an electronic control unit (ECU) 15 for receiving the supply of a power from a battery 18 mounted on a vehicle through an ignition switch 19 to control the driving of the brush-less motor 16 in accordance with a sensor signal from the steering angle sensor 12, the torque sensor 13 or a vehicle speed sensor 14.

When the driver operates the handle 100 in the vehicle on which the electric power steering device is mounted, the steering torque by the operation is detected by the torque sensor 13 and the steering angle is detected by the steering angle sensor 12. The brush-less motor 16 is driven by the ECU 15 in accordance with the detected steering torque, the steering angle and a vehicle speed detected by the vehicle speed sensor 14. Thus, the brush-less motor 16 generates the steering assist force. This steering assist force is applied to the steering shaft 102 through the reduction gear 7 to reduce the load of the driver in the steering operation. That is, the sum of the steering torque applied by operating the handle and the steering assist force generated by the brush-less motor 16 is applied to the rack pinion mechanism 104 through the steering shaft 102. Thus, when a pinion shaft rotates, the rotation is converted into a reciprocating movement of a rack shaft by the rack pinion mechanism 104. Opposite ends of the rack shaft are connected to wheels 108 through connecting members 106 including tie rods and knuckle arms. The directions of the wheels 108 are changed in accordance with the reciprocating movement of the rack shaft.

<2. Structure of Brush-less Motor>
<2.1 Entire Structure>

Figure 2:
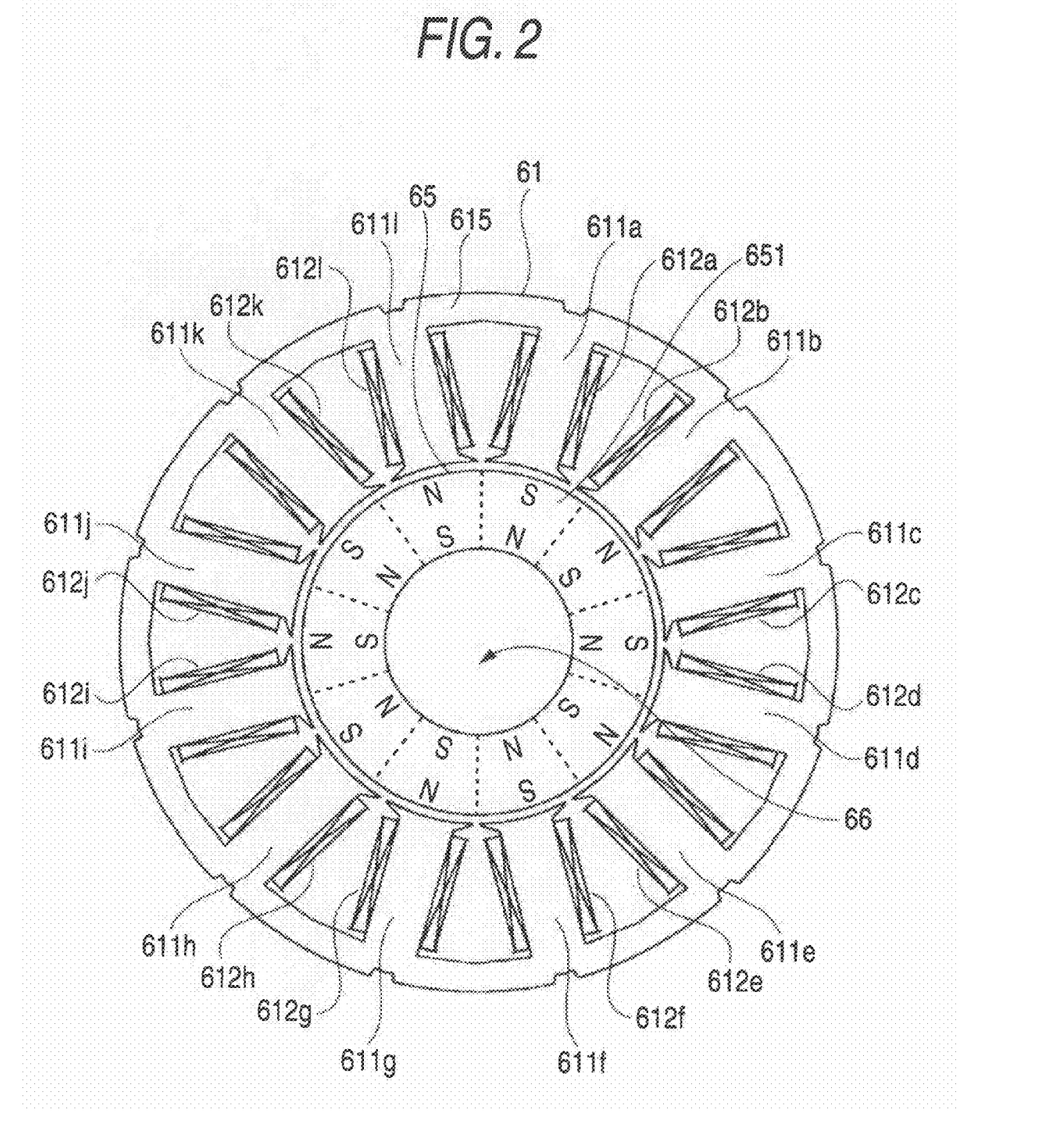
FIG. 2 is a vertical sectional view relative to the rotating axis of a brush-less motor in the above-described embodiment.

FIG. 2 is a vertical sectional view relative to the rotating axis of the brush-less motor 16. As shown in FIG. 2, the brush-less motor 16 includes a rotor 65 rotating on the axis of a motor shaft 66 as the rotating axis and a stator 61 provided so as to surround the rotor 65 with a narrow gap (an air gap) between them.

The rotor 65 includes one ring shaped permanent magnet 651 having 10 poles provided in the circumferential direction thereof so that the rotor has the 10 poles in the direction of the circumference. The permanent magnet 651 is a radial anisotropic sintered magnet whose orientation has anisotropy in the radial direction, magnetized in the radial direction and has N poles and S poles alternately arranged. Further, this permanent magnet 651 is magnetized so that what is called a skew for reducing a cogging is formed, which will be specifically described below.

The stator 61 includes a tubular yoke 615 and 12 teeth (salient poles) 611a to 611l of the same shapes provided so as to protrude toward the motor shaft 66 from the inner peripheral surface of the yoke 615. On the teeth 611a to 611l, corresponding windings 612a to 612l are wound. A predetermined current is supplied to these windings so that the stator 61 has 10 slots in the circumferential direction thereof. Accordingly, the brush-less motor 16 according to this embodiment is a motor having the 10 poles and 12 slots.

Further, in this stator 61, a laminated electromagnetic steel plate is used to reduce an eddy current loss. However, since this laminated electromagnetic steel plate hardly forms a complicated shape, coil end parts 611m having complicated three-dimensional shapes to fix the windings 612a to 612l are hardly formed as described below. Thus, for the coil end parts 611m of the teeth 611a to 611l, a soft magnetic powder material such as compressed iron powder that is easily processed is employed.

Here, specifically, the windings 612a to 612l are suitably connected by a three-phase electric power source not shown in the drawing so that three sets of four windings are respectively driven by an electric power of a U-phase, a V-phase or a W-phase. The three-phase electric power source outputs, for instance, pulse width modulation (PWM) signals as voltage signals whose pulse widths are respectively controlled correspondingly to the phases to control the rotation of the brush-less motor 16.

<2.2 Magnetized State of Rotor>

Here, the permanent magnet 651 disposed in the rotor 65 in the brush-less motor 16 is multi-pole magnetized in the circumferential direction and skew magnetized so as to be shifted at a central part along the axial direction. A magnetized state by this skew will be described by referring to FIGS. 3A and 3B.

Figure 3A:
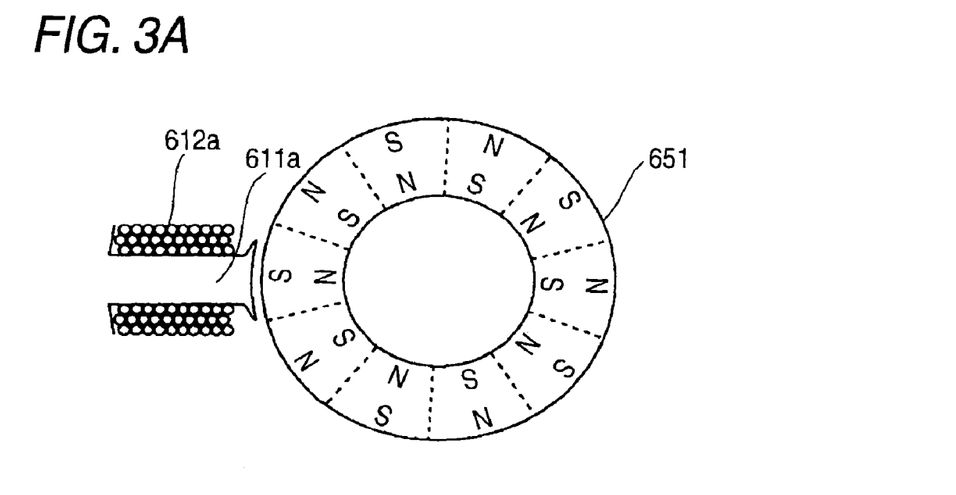
FIGS. 3A and 3B are external appearance views simply showing one tooth and the magnetized state of a permanent magnet in the embodiment.
Figure 3B:
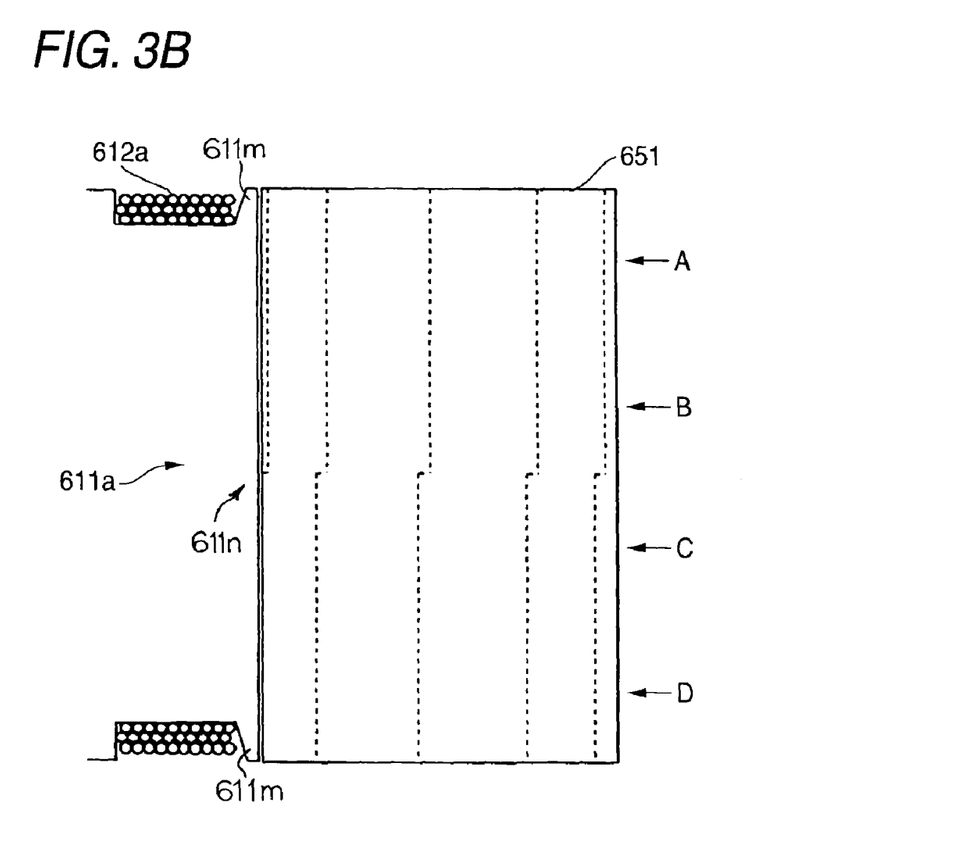

FIGS. 3A and 3B are external appearance views simply showing one tooth and the magnetized state of the permanent magnet. More specifically, FIG. 3A is a vertical sectional view of the tooth and the permanent magnet relative to the axial direction and FIG. 3B is a side external appearance view showing the permanent magnet from a vertical direction relative to the axial direction. The sectional view shown in FIG. 3A is a sectional view that an upper part shown in FIG. 3B is vertically cut relative to the axial direction. For the convenience of an explanation, the teeth 611a shown in FIG. 3B is shown in a sectional view that its central part is cut along the axial direction.

As shown in FIGS. 3A and 3B, here, only the tooth 611a is noticed and the teeth 611b to 611l are omitted from the drawings. On the outer peripheral part of the teeth 611a, the above-described winding 612a is wound and the coil end having the complicated shape is formed to fix the winding 612a.

Further, as shown in FIG. 3B, in the permanent magnet 651, the skew is magnetized so that a predetermined angle (refer it to as an "angle of skew", hereinafter) is shifted on an axis in the central part of the axial direction. Specifically, in the permanent magnet 651 shown in FIG. 3B, when the uppermost part to the central part thereof in the axial direction is vertically cut relative to the axial direction, the sectional view shown in FIG. 3A is obtained in any case. However, when the central part to a lowermost part in the axial direction is vertically cut relative to the axial direction, a section is obtained that the sectional view shown in FIG. 3A is rotated clockwise by the angle of skew in any case.

Here, the angle of skew is set to an angle obtained by dividing 180 degrees by the least common multiple of the number of the poles of the permanent magnet 651 and the number of the teeth 611a to 611l (this is equal to the number of slots as spaces between the adjacent teeth). Specifically, since this brush-less motor 16 is a motor having the 10 poles and 12 slots, the angle of skew is set to 3 degrees as an angle obtained by dividing 180 degrees by the least common multiple 60 of 10 and 12.

Since it is known that the least common multiple of the number of the poles and the number of the slots is equal to the number of coggings generated when the rotor 65 rotates once, when 360 degrees are divided by the least common multiple, the rotating angle of the rotor 65 necessary for generating one cogging can be derived. From this fact, as shown in FIG. 3B, when the permanent magnet 651 is skew magnetized along the axial direction so that an angle (angle of skew) ½ times as large as the above-described rotating angle is shifted on an axis at the central position in the axial direction, the cogging generated in the upper side from the central part can be made to have a phase opposite to a phase of the cogging generated in the lower side from the central part. Thus, the coggings can be cancelled with each other to reduce or cancel the cogging. Further, this will be described by referring to FIG. 4.

Figure 4:
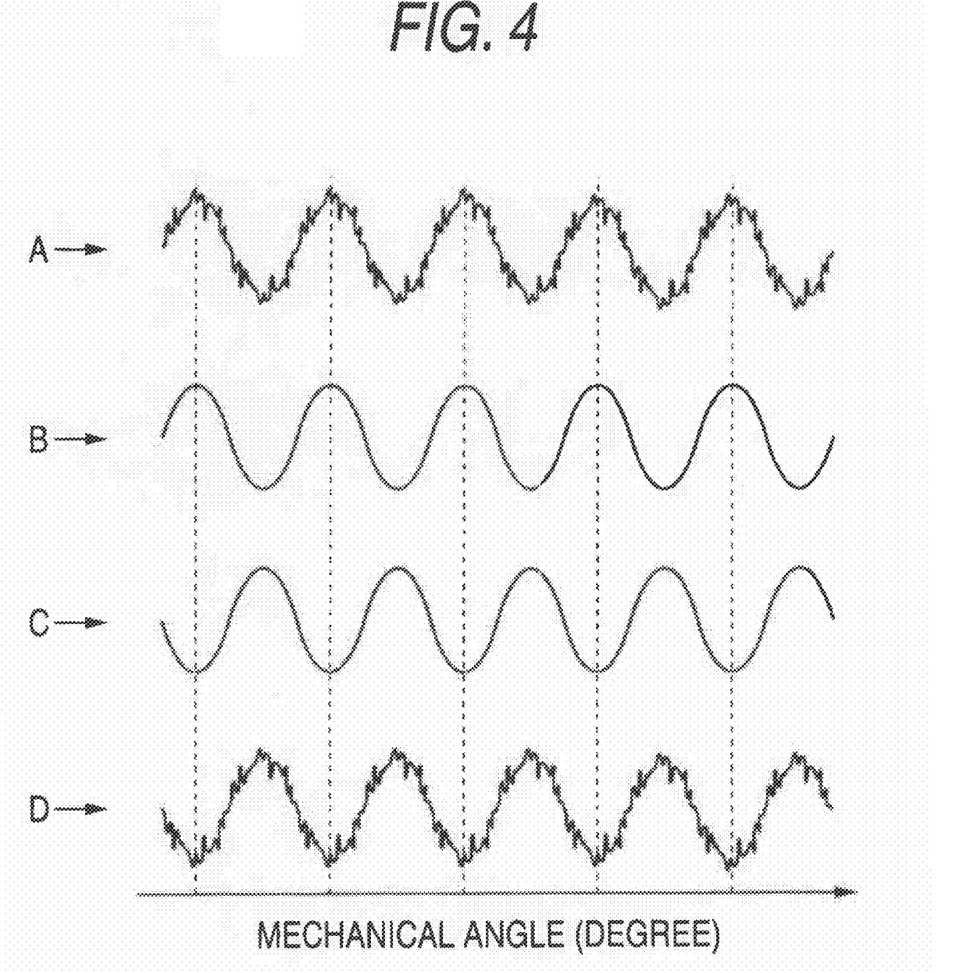
FIG. 4 is a wave form diagram for explaining that a cogging is reduced or cancelled in the embodiment.

FIG. 4 is a wave form diagram for explaining that the cogging is reduced or cancelled. Here, positions A to D shown in FIG. 4 correspond to positions A to D shown in FIG. 3B. These positions A to D show positions on the surface of the permanent magnet 651 determined along the axial direction. It is assumed that a distance between the position A and the position C is equal to a distance between the position B and the position D, and the distance is half as long as a length in the axial direction in the permanent magnet 651. An axis of abscissa shown in FIG. 4 designates a mechanical angle representing the rotating angle of the rotor 65.

Referring to FIG. 4, the coggings generated in the position A and the position D include component repeatedly and similarly varying for each basic cycle and component irregularly varying within the one cycle (refer them directly to as "irregularly varying components" hereinafter). The above-described thing arises, because, as described above, parts near the opposite end parts of the teeth do not have the same sectional shapes along the axial direction owing to the three-dimensional shapes of the coil ends provided in the opposite ends of the teeth, so that in parts (the position A and the position D in FIGS. 3B and 4) near the opposite ends of the rotor 65 corresponding to the parts near the coil ends, the coggings including the irregularly varying components corresponding to the above-described three-dimensional shapes are generated.

In fact, since the coggings generated in the position A and the position D include the irregularly varying components corresponding to the three-dimensional shapes of the coil ends, when the three-dimensional shapes of the coil ends at the opposite ends of the teeth are the same, the above-described components are also the same. Further, the sectional shape of the coil end is symmetrical with respect to a vertical line as a center to the axial direction of the rotor 65. Accordingly, as can be understood by referring to FIG. 4, since the above-described coggings have opposite phases to each other, these coggings including the irregularly varying components are offset with each other and cancelled or at least largely reduced. As can be understood from the drawing in which the coggings arising in the position B and the position C have opposite phases to each other, since the cogging arising in the upper side from the central part in the axial direction of the permanent magnet 651 and the cogging arising in the lower side from the central part have the opposite phases to each other, these coggings are offset with each other so that the coggings can be reduced or cancelled.

As compared therewith, in the usual structure that the skew is obliquely magnetized in the rotor, since the irregularly varying components are not included in the cogging that is to cancel the cogging including the irregularly varying components, these coggings are not completely cancelled with each other. After all, the coggings cannot be sufficiently reduced. Now, an example in which the rotor (the magnetized state of the permanent magnet included therein) of the brush-less motor 16 in this embodiment has the usual structure will be specifically described by referring to FIGS. 5A and 5B.

<2.3 Comparison With Magnetized State In Usual Rotor>

Figure 5A:
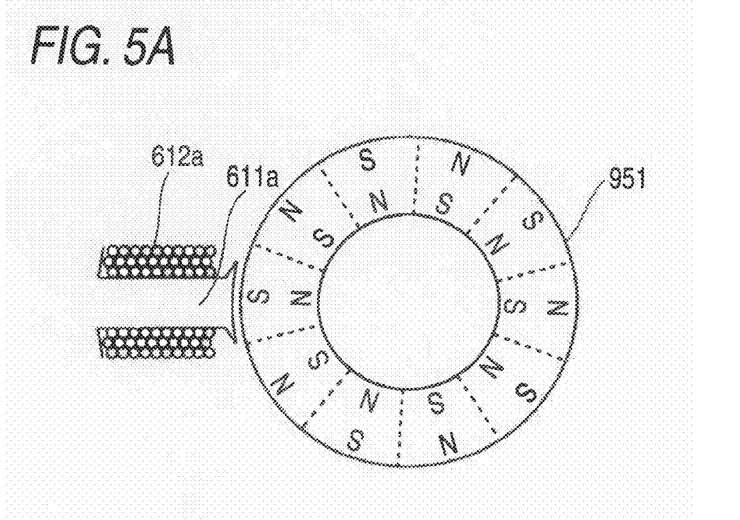
FIGS. 5A and 5B are external appearance views simply showing one tooth and the magnetized state of a usual permanent magnet in a usual example.
Figure 5B:
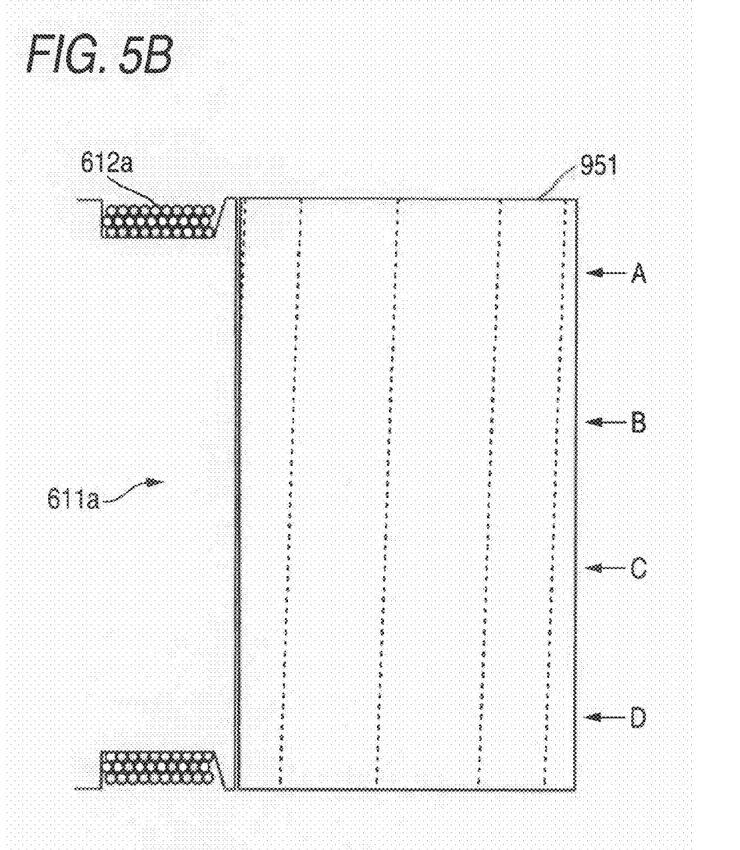
Figure 6:
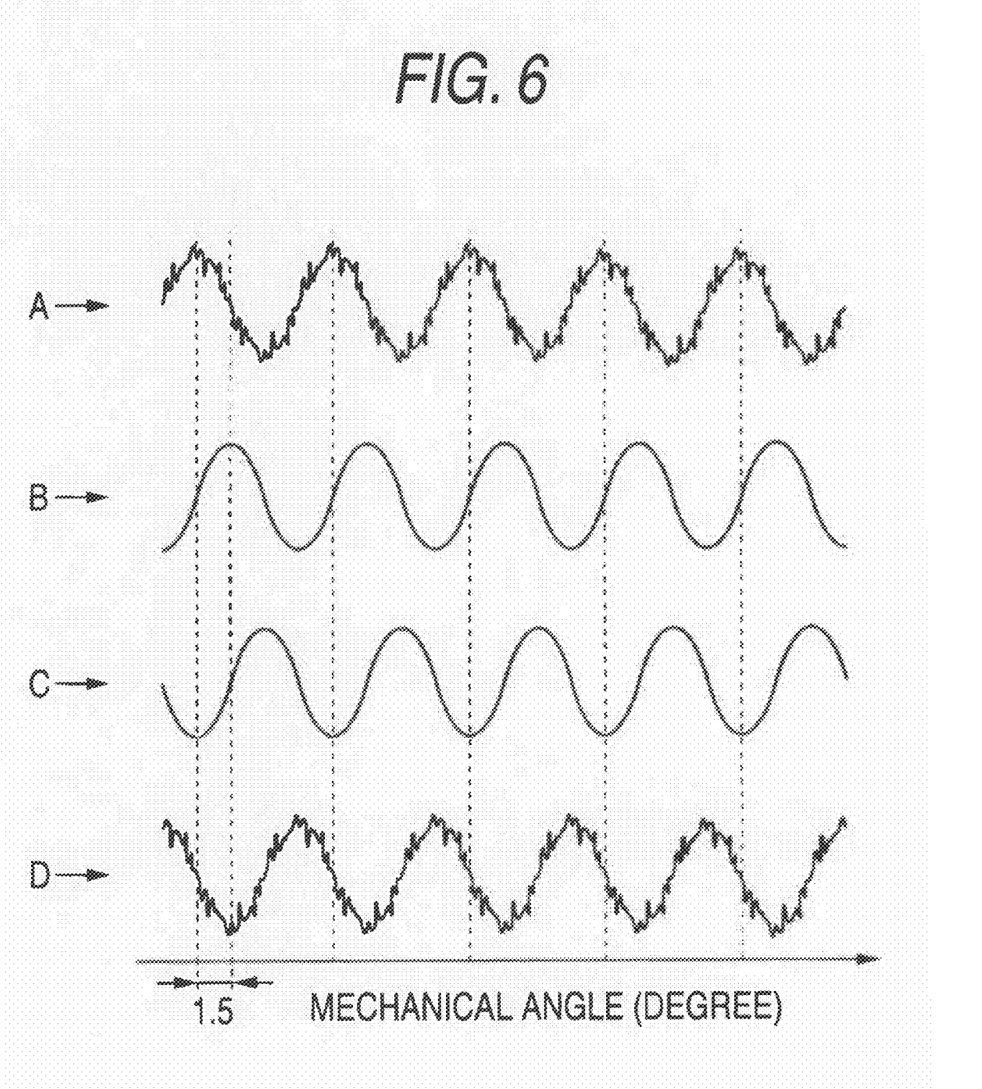
FIG. 6 is a wave form diagram for explaining that a cogging is not reduced or cancelled in the structure of the usual example.

FIGS. 5A and 5B are external appearance views simply showing one tooth and the magnetized state of the usual permanent magnet. More specifically, FIG. 5A is a vertical sectional view of the tooth and the usual permanent magnet relative to the axial direction and FIG. 5B is a side external appearance view showing the usual permanent magnet from a vertical direction relative to the axial direction. FIGS. 5A and 5B are views corresponding to FIGS. 3A and 3B and the same components are designated by the same reference numerals. An explanation thereof will be omitted.

As shown in FIG. 5B, in the usual permanent magnet 951, a skew is obliquely magnetized relative to the axial direction so that a predetermined angle (here, set to the same value as the angle of skew in this embodiment) is shifted on an axis at the central part in the axial direction. Now, coggings in positions A to D shown in FIG. 5B will be described below by referring to FIG. 6.

FIG. 6 is a wave form diagram for explaining that the coggings are not reduced or cancelled by the usual structure.

Referring to FIG. 6, the coggings generated in the position A and the position D include irregularly varying components owing to the three-dimensional shapes of coil ends as in the case shown in FIG. 4. However, an example shown in FIG. 6 is different from that shown in FIG. 4. Since the coggings generated in the position A and the position D do not have opposite phases to each other, the components cannot be cancelled with each other. The coggings generated in the position A and the position C have opposite phases to each other, however, the cogging generated in the position C does not include the irregularly varying components. Thus, it is to be understood that the components cannot be cancelled with each other.

<3. Effect>

As described above, in the brush-less motor 16 in this embodiment, the permanent magnet 651 of the rotor 65 is skew magnetized in such a way that a surface to one end part from the central part in the axial direction is shifted by a predetermined angle of skew on an axis from a surface to the other end part from the central part in the circumferential direction. Thus, the coggings including the irregularly varying components generated correspondingly to the three-dimensional shapes of the coil ends respectively provided at the opposite end parts of the teeth can be cancelled or reduced.

The brush-less motor having such an effect is provided, and accordingly, the electric power steering device can be provided that gives an operator a good steering feeling.

<4. Modified Example>

<4.1 Main Modified Example>

In the above-described embodiment, as shown in FIGS. 3A and 3B, the permanent magnet 651 of the rotor 65 is skew magnetized along the axial direction in such a way that the surface to one end part from the central part in the axial direction is shifted by the predetermined angle of skew on the axis from the surface to the other end part from the central part in the circumferential direction. However, the skew is not necessarily magnetized along the axial direction. When the skew is magnetized so that the surface to the one end part from the central part is shifted by a predetermined distance corresponding to the angle of skew from the surface to the other end part from the central part in the circumferential direction, for instance, the skew may be obliquely magnetized. In fact, when the skew is obliquely magnetized, a torque loss arises. Thus, the structure of the above-described embodiment in which the skew is applied along the axial direction is preferable.

Figure 7A:
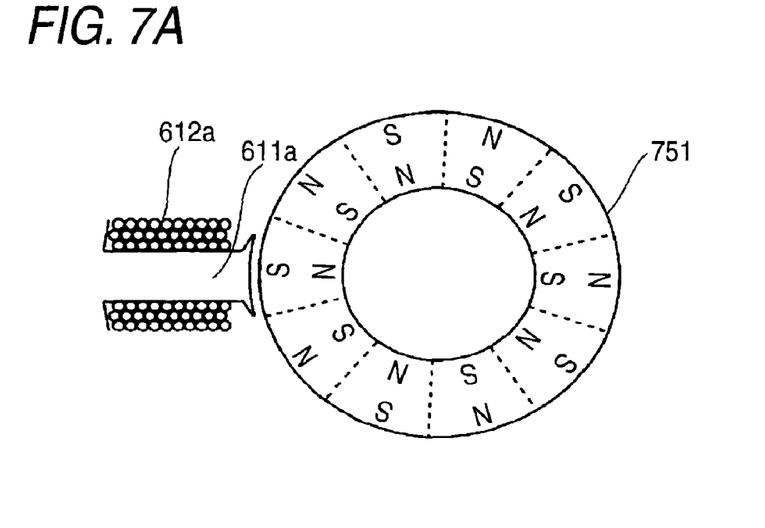
FIGS. 7A and 7B are external appearance views simply showing the magnetized state of a permanent magnet in a main modified example of the embodiment.
Figure 7B:
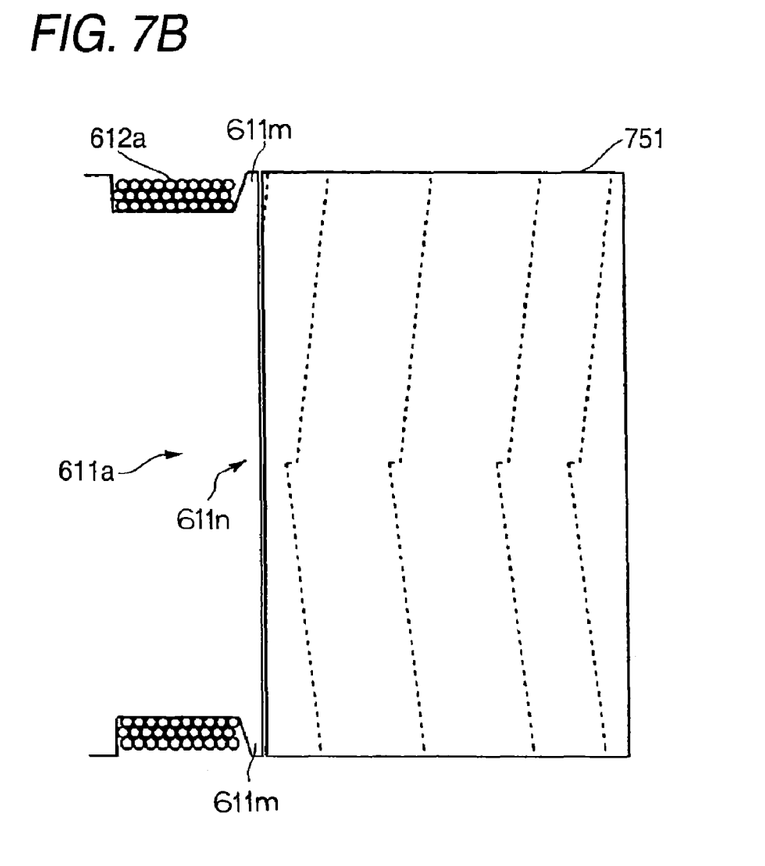

FIGS. 7A and 7B are external appearance views simply showing one tooth and the magnetized state of a permanent magnet in the main modified example. More specifically, FIG. 7A is a vertical sectional view of the tooth and the permanent magnet in the modified embodiment relative to the axial direction and FIG. 7B is a side external appearance view showing the permanent magnet in the modified example from a vertical direction relative to the axial direction. FIGS. 7A and 7B are views corresponding to FIGS. 3A and 3B and the same components are designated by the same reference numerals. An explanation thereof will be omitted.

Referring to FIGS. 7A and 7B, a skew is magnetized obliquely at a surface angle that a surface (refer it to as an "upper side surface", hereinafter) to an end part in an upper side from a central part and a surface (refer it to as a "lower side surface", hereinafter) to an end part in a lower side from the central part are symmetrical so as to be folded by a central line along the axial direction of the permanent magnet 751. Further, the upper side surface and the lower side surface are skew magnetized so as to be shifted by the same angle of skew as that of the above-described embodiment in the circumferential direction.

In this structure, in the upper side surface and the lower side surface of the permanent magnet 751, the phases of coggings generated at positions of the same distance in the axial direction from the central line are opposite to each other. Further, since the positions of the permanent magnet 751 corresponding to coil ends provided at the opposite end parts of the tooth are located at positions having equal distances from the central line, the coggings including irregularly varying components generated at these positions are cancelled with each other. Thus, the coggings are cancelled or at least largely reduced. Accordingly, the same effects as those of the above-described embodiment can be achieved.

The skew magnetization may be carried out, for instance, not only the skew magnetization in the oblique direction in the main modified example, but also the skew magnetization in which a direction changes halfway from the central part to the end part, so that the upper side surface and the lower side surface are symmetrical so as to be folded by the central line along the central part in the axial direction of the permanent magnet 751, and the upper side surface and the lower side surface are shifted from each other by the same angle of skew as that of the above-described embodiment in the circumferential direction.

<4.2 Other Modified Examples>

According to the above-described embodiment, the irregularly varying components included in the coggings are generated due to the three-dimensional shapes of the coil ends provided at the opposite end parts of the teeth. However, the irregularly varying components may not be generated due to the shapes of the coil ends, but may be generated due to different shapes included in the teeth from other parts. Namely, the sectional shapes perpendicular to the axial direction within a range in which the teeth are opposed to the rotor 65 may include two parts 611m having a sectional shape different from that of the remaining part 611n, and the two parts may be respectively located at positions of substantially equal distances from the central part in the axial direction. Thus, since the coggings including the irregularly varying components respectively have opposite phases due to the above-described skew, the coggings are offset with each other and accordingly cancelled or reduced.

In the stator 61 in this embodiment, the laminated electromagnetic steel plate is basically used. In the coil end parts of the teeth 611a to 611l, the soft magnetic powder material is used. However, for instance, the laminated electromagnetic steel plate or the soft magnetic powder material may be used for all the part. Any of materials suitable for the stator may be used without a limitation.

The angle of skew in the above-described embodiment is calculated by dividing 180° by the least common multiple of the number of the poles of the permanent magnet 651 and the number (the number of slots) of the teeth 611a to 611l. However, a calculating method is not limited to the above-described calculating method, and the skew of angle may be calculated by a well-known calculating equation or a numerical simulation or a rule of thumb.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

What is claimed is:

1. A brush-less motor comprising:
an annular stator; and
a rotor disposed inside the stator and being rotatable relative to the stator, the rotor including a single annular permanent magnet having a plurality of poles that are alternated in the circumferential direction of the permanent magnet and are magnetized in the axial direction of the permanent magnet,
wherein the stator includes:
a plurality of teeth parts that are arranged at equal intervals along a circumferential direction of the stator and extend toward the rotor, respectively; and
an annular yoke part that connects the plurality of teeth parts together,
wherein each of the teeth parts includes a central part that is central in an axial direction thereof and end parts that are respectively disposed at positions equally spaced from the central part,
wherein a sectional shape of each of the end parts in a direction perpendicular to the axial direction is different from a sectional shape of the central part in the direction perpendicular to the axial direction, and
wherein each of the poles has:
a first axial part extending from an axial central part of the permanent magnet to one axial end part of the permanent magnet; and
a second axial part extending from the axial central part of the permanent magnet to the other axial end part of the permanent magnet;
wherein the first axial part and the second axial part are shifted from each other by a predetermined angle in the circumferential direction of the permanent magnet at the axial central part.

2. The brush-less motor according to claim 1, wherein the angle obtained by dividing 180 degrees by a least common multiple of the number of the plurality of poles and the number of the plurality of teeth parts.

3. The brush-less motor according to claim 1, wherein the end parts are made of a soft magnetic powder material.

4. An electric power steering device comprising the brush-less motor according to claim 1, wherein the brush-less motor is driven in accordance with an operation by an operating unit for steering a vehicle to give a steering assist force to a steering mechanism of the vehicle.

* * * * *